(12) United States Patent
Hovestadt et al.

(10) Patent No.: US 6,335,381 B1
(45) Date of Patent: Jan. 1, 2002

(54) AQUEOUS COATING COMPOSITIONS CONTAINING URETHANE (METH) ACYLATES HAVING UV-HARDENING ISOCYANATE GROUPS

(75) Inventors: Wieland Hovestadt, Leichlingen; Wolfgang Fischer, Meerbusch; Manfred Bock, Leverkusen; Theodor Engbert, Köln, all of (DE); Lothar Kahl, Edo de Mexico (MX)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/294,854

(22) Filed: Apr. 20, 1999

(30) Foreign Application Priority Data

Apr. 23, 1998 (DE) .......................... 198 18 312

(51) Int. Cl.[7] ................. C08F 2/50; C08F 2/48
(52) U.S. Cl. .................. 522/84; 522/86; 522/96; 522/173; 522/174; 528/44; 528/65; 524/591; 524/507
(58) Field of Search .................. 522/84, 86, 173, 522/174, 96; 524/591, 507; 528/44, 65

(56) References Cited

U.S. PATENT DOCUMENTS

| | | | | |
|---|---|---|---|---|
| 4,287,039 A | * | 9/1981 | Buethe et al. | 204/159.19 |
| 4,339,566 A | * | 7/1982 | Rosenkranz et al. | 528/68 |
| 4,342,793 A | | 8/1982 | Skinner et al. | 427/44 |
| 4,358,476 A | * | 11/1982 | Zimmer et al. | 427/44 |
| 4,393,187 A | * | 7/1983 | Boba et al. | 528/60 |
| 4,420,499 A | * | 12/1983 | Bolgiano et al. | 427/53.1 |
| 4,722,966 A | * | 2/1988 | Flakus | 524/840 |
| 4,730,021 A | * | 3/1988 | Zom et al. | 524/457 |
| 5,066,713 A | * | 11/1991 | Flakus | 524/591 |
| 5,075,370 A | | 12/1991 | Kubitza et al. | 524/591 |
| 5,135,963 A | * | 8/1992 | Haeberle | 522/84 |
| 5,200,463 A | * | 4/1993 | Flakus | 524/591 |
| 5,236,968 A | * | 8/1993 | Hirschmann | 522/78 |
| 5,360,835 A | * | 11/1994 | Sato et al. | 522/85 |
| 5,409,740 A | * | 4/1995 | Brann | 427/513 |
| 5,459,196 A | * | 10/1995 | Kressdorf et al. | 524/591 |
| 5,548,005 A | * | 8/1996 | Kurth et al. | 523/414 |
| 5,554,712 A | * | 9/1996 | Huynh-Tran et al. | 528/58 |
| 5,569,705 A | * | 10/1996 | Vogt-Birnbrich et al. | 524/591 |
| 5,684,081 A | * | 11/1997 | Dannhorn et al. | 524/507 |
| 5,843,576 A | * | 12/1998 | Rosenberry et al. | 428/423.1 |
| 5,854,300 A | * | 12/1998 | Gould et al. | 522/85 |

FOREIGN PATENT DOCUMENTS

EP 0753531 * 1/1997

* cited by examiner

Primary Examiner—James J. Seidleck
Assistant Examiner—Sanza L. McClendon
(74) Attorney, Agent, or Firm—Joseph C. Gil; Thomas W. Roy

(57) ABSTRACT

The present invention relates to an aqueous coating composition containing a) a urethane (meth)acrylate having (meth)acryloyl groups and optionally free isocyanate groups, b) optionally a further polyisocyanate, c) a UV initiator which initiates polymerization by a free radical mechanism, and d) one or more aqueous binders containing isocyanate-reactive groups.

The present invention also relates to the use of the coating compositions for coating various substrates, especially metal substrates.

7 Claims, No Drawings

AQUEOUS COATING COMPOSITIONS CONTAINING URETHANE (METH) ACYLATES HAVING UV-HARDENING ISOCYANATE GROUPS

BACKGROUND OF THE INVENTION

1. Field of the Invention

The present invention relates to aqueous coating compositions containing urethane (meth)acrylates and binders containing isocyanate-reactive groups and to their use for coating various substrates, especially metal substrates.

2. Description of the Prior Art

The hardening of coating compositions containing meth)acryloyl groups by UV-initiated polymerization which proceeds by a free radical mechanism is a known and industrially established procedure. It is one of the most rapid methods of hardening in coating technology. However, UV-hardening lacquers have certain disadvantages, such as their high volume shrinkage during hardening, which can result in adhesion problems. The high crosslink density which is inherent in the system results in brittleness, lack of flexibility and a lack of impact strength. Also, the hardening of coating compositions containing UV-hardening (meth)acryloyl groups is dependent on the availability of a sufficient dosage of radiation of the appropriate wavelength. Poorly exposed regions suffer from reduced hardening, which results in appreciable losses in surface resistance, and unexposed regions do not harden at all.

Coatings are known which are prepared from aqueous binder compositions containing polyisocyanates and compound with isocyanate-reactive groups, preferably polyols as described, e.g., in EP-A 358,979.

Due to the wide choice of reactants, the technical properties of these coatings, such as adhesion, flexibility, impact strength and resistance to weathering, can be varied over a wide range. However, compared with radiation-hardening systems, the hardening of aqueous two-component polyurethane compositions requires a long time, even at elevated temperatures. Another difference is that UV light is not necessary for curing.

Combinations of both types of hardening, i.e., so-called dual cure systems hardening by UV radiation and hardening by polyurethane formation, are also known for solvent-based lacquers. For example, U.S. Pat. No. 4,342,793 describes hardenable resin compositions which contain a radiation-hardenable reactive thinner (low molecular weight esters of acrylic acid), a saturated polyol and a polyisocyanate. Hardening is carried out by irradiation in order to polymerize the reactive thinner, which is followed by thermal hardening to form a polyurethane from the polyol and the polyisocyanate.

One disadvantage of these compositions is that the solvent content and thus the level of emissions is relatively high. In addition, if the irradiation conditions are unfavorable, any reactive thinner which is not chemically incorporated can remain behind in the hardened lacquer film. This can result in problems, e.g., if the lacquer film contacts skin. Also, there may be a negative effect on the properties of the lacquer film, such as its hardness and physical and chemical resistance.

An object of the present invention is to provide a coating composition which contains an aqueous binder and in which lacquered parts may be rapidly handled due to UV hardening. It is an additional object of the present invention to be able to vary the properties depending upon the particular application by the choice of crosslinking constituents, preferably polyols containing active hydrogen the present invention to achieve satisfactory hardening even in unexposed or poorly exposed regions.

Surprisingly, these objects may be attained with the coating compositions of the present invention, which contain urethane (meth)acrylates having (meth)acryloyl groups and optionally free NCO groups, and also aqueous polyols and optionally polyisocyanates. In these compositions UV-hardening can be carried out to produce coatings that can be rapidly handled. Subsequent crosslinking by the reaction of NCO then proceeds to completion and results in coatings which exhibit high chemical and mechanical resistance. In areas of poor exposure if there is a certain residual density of double bonds, crosslinking is ensured via the reaction of NCO and thus a minimum required level of resistance is ensured.

This is surprising since it had been assumed that the two reaction processes would impede each other, i.e., the rapid UV-initiated polymerization would "freeze-in" the slower reaction of NCO, such that the reaction of NCO groups with compounds containing isocyanate-reactive groups would not proceed to completion.

SUMMARY OF THE INVENTION

The present invention relates to an aqueous coating composition containing
  a) a urethane (meth)acrylate having (meth)acryloyl groups and optionally free isocyanate groups,
  b) optionally a further polyisocyanate,
  c) a UV initiator which initiates polymerization by a free radical mechanism, and
  d) one or more aqueous binders containing isocyanate-reactive groups.

The present invention also relates to the use of the coating compositions for coating various substrates, especially metal substrates.

DETAILED DESCRIPTION OF THE INVENTION

The present coating composition is preferably produced as two components, wherein component I) preferably contains constituents a)+b), and the second component II) contains constituents c)+d). In component I) the equivalent ratio of the (meth)acryloyl groups of component a) to the sum of the free isocyanate groups of components a) and b) is preferably 0.5:2.0 to 2.0:0.5

In order to obtain better coating properties, components I and/or II may additionally contain
  e) an UV absorber having an absorption range up to 390 nm,
  f) a hindered amine light (HALS) stabilizer,
  g) other coating additives,
  h) a catalyst to speed up the reaction of NCO groups and
  i) a co-solvent which is inert to the crosslinking reaction.

Components I) and II) are combined to provide an equivalent ratio of NCO groups to isocyanate-reactive groups of 2:1 to 0.5:1, preferably 1.5:1 to 0.8:1 and more preferably 1.3:1 to 1:1.

Compounds a) are produced from monohydric alcohols containing (meth)acryloyl groups and di- or polyisocyanates. Methods for producing urethane (meth)acrylates are known and have been described, e.g., in DE-A 1,644,798, DE-A 2,115,373, DE-A 2,737,406. The equivalent ratio of NCO groups to OH groups in the urethane (meth)acrylates according to the invention preferably ranges from 1:0.2 to 1:1, more preferably 1:0.2 to 1:0.8 and most preferably 1:0.3 to 1:0.6.

Suitable monohydric alcohols containing (meth)acryloyl groups include esters of acrylic or methacrylic acid with dihydric alcohols, such as 2-hydroxyethyl, 2- or 3-hydroxypropyl or 2-, 3- or 4-hydroxybutyl (meth)acrylate, and also mixtures of compounds of this type. Also suitable are reaction products obtained by the esterification of n-hydric alcohols or mixtures thereof with (meth)acrylic acid, wherein "n" represents a whole number or fractional number of >2 to 4, preferably 3. These compounds are preferably prepared by reacting (n-0.8) to (n-1.2), more preferably (n-1) moles of (meth)acrylic acid per mole of the n-hydric alcohols. Examples of these compounds or mixtures thereof include the reaction products of i) glycerol, trimethyolpropane and/or pentaerythritol,
ii) the low molecular weight alkoxylation products of these alcohols (such as ethoxylated or propoxylated trimethyolpropane, e.g. the addition product of ethylene oxide with trimethylolpropane with an OH number of 550), or
iii) mixtures of i) and/or ii) with dihydric alcohols (such as ethylene glycol or propylene glycol) with
iv) (meth)acrylic acid.

These compounds have an number average molecular weight ($M_n$) of 116 to 1000, preferably 116 to 750 and more preferably 116 to 158.

In principle, all di- or polyisocyanates are suitable for the production of urethane (meth)acrylates a) according to the invention. Examples include butylene diisocyanate, hexamethylene diisocyanate (HDI), 1-isocyanato-3,3,5-trimethyl-5-isocyanatomethyl-cyclohexane (IPDI), bis (isocyanatocyclohexyl)-methane, other known aliphatic diisocyanates, or mixtures thereof.

Also suitable are "lacquer polyisocyanates" prepared from these diisocyanates. "Lacquer polyisocyanates" are the known derivatives of these diisocyanates containing biuret, urethane, uretdione and/or isocyanurate groups. Methods of producing these "lacquer polyisocyanates" are described, e.g., in U.S. Pat. Nos. 3,124,605, 3,358,010, 3,903,126, 3,903,127, 3,975,622 and 4,324,879.

It is also possible to use aromatic polyisocyanates, e.g., "lacquer polyisocyanates" prepared from 2,4-diisocyanatotoluene or mixtures thereof with 2,6-diisocyanatotoluene, or those prepared from 4,4'-diisocyanato-diphenylmethane or mixtures thereof with its isomers and/or higher homologs. It is also possible to any mixtures of the polyisocyanates cited as examples.

To facilitate the incorporation of urethane (meth)acrylates a) into aqueous binders d), polyisocyanates which have been rendered hydrophilic can also be used to prepare component a), either on their own or in admixture with the polyisocyanates described above which have not been rendered hydrophilic. Hydrophilic properties can be imparted anionically, cationically or non-ionically via internal or external emulsifiers such as polyethers. Hydrophilic polyisocyanates are described, e.g., in EP-A 443,138, EP-A 469,389, EP-A 486,881, EP-A 510,438, EP-A 540,985, EP-A 645,410. EP-A 697,424 and EP-A 728,785.

The addition reaction described above can be accelerated in known manner by the addition of suitable catalysts, such as tin octoate, dibutyltin dilaurate or tertiary amines.

It is possible to stabilize the resulting urethane (meth) acrylate a), which optionally contains free NCO groups, against premature polymerization by the addition of suitable inhibitors and antioxidants, such as phenols or hydroquinones, and also by the addition of quinones, such as 2,5-di-tert-butylquinone. These inhibitors are each added in amounts of 0.001 to 0.3% by weight during or after production. Component a) may optionally be produced in solvents which are inert during the production and use of component a). These solvents are then classified as co-solvents i).

The polyisocyanates which can be employed as component b) includes the polyisocyanates that are suitable for the production of the urethane (meth)acrylates. The preferred aliphatic "lacquer polyisocyanates" are those which are prepared from HDI, IPDI or bis(isocyanatocyclohexyl) urethane, the corresponding hydrophilic polyisocyanates and mixtures of these "lacquer polyisocyanates."

To reduce its viscosity, component I) may optionally contain radiation-curable reactive thinners, such as the low molecular weight esters of acrylic acid.

The equivalent ratio of the methacryloyl groups of component a) to the sum of the free isocyanate groups of components a) and b) is between 0.2 to 5.0 and 5 to 0.2, preferably between 0.5 to 2.0 and 2.0 to 0.5.

Suitable UV initiators c) include 2-hydroxyphenyl ketones such as 1-hydroxycyclohexyl phenyl ketone, benzil ketals such as benzil dimethyl ketal, acylphosphine oxides such as bis-(2,4,6-trimethylbenzoyl)-phenylphosphine oxide, benzophenone and derivatives thereof, and mixtures of these different types of UV initiators.

All resin dispersions which are customary in two-component polyurethane coating technology can also be used as component d).

Resins of this type, and methods of producing these resins, are known from the literature. These resins may be synthesized from polyesters, polyacrylates, polyurethanes, polyureas, polycarbonates or polyethers. It is also possible to use hybrid dispersions and mixtures of different dispersions. Preferably, the resins are hydroxy- or amino-functional. In certain cases it is also possible to use non-functional dispersions as a binder component. It is also possible, but is not preferred, to use resin dispersions which, in addition to hydroxy or amino groups, also contain unsaturated groups which are suitable for UV hardening.

To impart weather-resistance to the hardened lacquer coat, a UV absorber e) with an absorption range of up to a maximum of 390 nm can be added together with a HALS stabilizer. Suitable UV absorbers include those of the triphenyltriazine type (e.g., Tinuvin 400, Ciba) or the oxalic acid dianilide type (e.g. Sanduvor 3206, Clariant).

The UV absorbers are preferably each added in amounts of 0.5 to 3.5%, based on the solids content of the binder.

Suitable HALS stabilizers f) include Tinuvin 292 or Tinuvin 123 (Ciba) and Sanduvor 3058 (Clariant). The HALS stabilizers are preferably added in amounts of 0.5% to 2.5%, based on the solids content of the binder.

Examples of lacquer additives g) include flow enhancers, deaeration agents, antifoaming agents, thickeners and thixotropic agents.

Catalysts h) may optionally be added in order to accelerate the polyurethane crosslinking reaction. Suitable catalysts include those known from two-component polyurethane technology, such as tin octoate, dibutyltin dilaurate or tertiary amines.

Hardener component I) preferably has a viscosity at 23° C. of 50 to 10,000, preferably 50 to 2000 mPa.s (D=40). If necessary, the polyisocyanates can be mixed with small amounts of inert solvents to reduce their viscosity to a value within this range. However, the maximum amount of these solvents is selected such that a maximum of 20% by weight, preferably 10% by weight, of solvents are present in the coating compositions according to the invention. Any solvent which may optionally be present in resin dispersion d) is also included in the amount.

Examples of suitable solvents include aliphatic or aromatic hydrocarbons (such as xylene, toluene or solvent naphtha), N-methylpyrrolidone, diethylene glycol dimethyl ether, acetone, methyl ethyl ketone, methyl isobutyl ketone, ethyl acetate, butyl acetate, methoxypropyl acetate and mixtures of these or other inert solvents.

In order to produce the aqueous binder composition, hardener component I) is emulsified in aqueous resin component II). During this procedure, the requisite processing viscosity is obtained by adding water. Simple emulsification techniques are generally satisfactory, e.g. a mechanical stirrer or simple mixing the two components by hand is often sufficient to obtain coatings with very good properties. Mixing techniques which impart a high level of shearing energy can also be used, such as the jet dispersion technique described in Farbe und Lack 102/3, 1996, pages 88–100.

Coatings can be produced by very different spraying methods, such as compressed air, airless or electrostatic spraying methods using one- or two-component spraying installations. Coatings can also be produced by brushing, rolling or by rollers or doctor blade.

Drying and hardening of the coatings are preferably carried out by
1. Removal of water and optional co-solvents by aeration at room temperature or optionally at elevated temperature, preferably at a temperature of up to 100° C.
2. UV-hardening. Commercially available mercury high-pressure or mediumpressure radiation emitters are suitable. These radiation emitters may contain other elements as dopants and preferably have an output of 80 to 240 W/cm lamp length.
3. Subsequent crosslinking of the NCO-containing components with the isocyanate-reactive components. This can be done at room temperature or at an elevated temperature, which is preferably <150° C.

The present invention also relates to the use of these coating compositions for the production of coatings on various substrates and materials, such as wood, metals, plastics, etc. The coating compositions are preferably used for the coating of automotive body parts.

EXAMPLES

All parts and percentages are by weight unless otherwise indicated. Viscosity measurements were made in a cone and plate viscometer according to DIN 53019 with D=40.

Binder A—Isocyanate-reactive Binder

An aqueous polyacrylate dispersion which was free from co-solvent and prepared from 6% methyl methacrylate, 32% butyl acrylate, 12% butyl methacrylate, 5% styrene 38% hydroxyphenyl methacrylate and 3% acrylic acid using 4% di.-tert.-butyl peroxide as the initiator and dimethyl ethanolamine as the neutralizing agent. The polyacrylate dispersion had a solids content of about 50%, a viscosity of about 500 mPa.s (23° C.; D=40), an acid number of about 12 mg KOH/g substance, an OH content of 2.2% and a pH of about 7.9.

Binder B—Isocyanate-reactive Binder

An aqueous urethane-modified polyester dispersion which was free from co-solvent and prepared from 13% trimethylolpropane, 13% neopentyl glycol, 11% 1,6-hexanediol, 6% cyclohexanedimethanol, 29% 1,4-hexahydrophthalic anhydride, 10% adipic acid, 4% dimethylolpropionic acid, 14% isophorone diisocyanate, and dimethyl ethanolamine as the neutralizing agent. The dispersion had a solids content of about 42%, a viscosity of about 1000 mPa.s (23° C.; D=40), an acid number of about 8 mg KOH/g substance, an OH content of 1.5% and a pH of about 8.4.

Example 1—Urethane (meth)acrylate According to the Invention 1268.7 g of an HDI isocyanurate having an NCO content of 23%, 0.96 g of dibutyltin dilaurate and 1.92 g of 2,6-di-tert.-butylcresol were weighed into a stirred vessel fitted with a thermocouple, dropping funnel, reflux condenser, gas inlet and gas outlet.

Three times the vessel volume of air per hour were passed through the batch with stirring, and six times the vessel volume of nitrogen per hour were passed over the batch. The batch was heated to 50° C. Above 50° C., 266.8 g of hydroxyethyl acrylate was added dropwise such that the temperature rose to a maximum of 60° C. due to the exothermic reaction. After the addition of the hydroxyethyl acrylate was complete (duration about 6 to 8 hours), the batch was stirred at 60° C. for an additional hour. A urethane acrylate solution was formed which had an NCO content of 11.5%.

Example 2—Urethane (meth)acrylate According to the Invention 1268.7 g of an HDI isocyanurate having an NCO content of 23%, 519.4 g of methoxypropyl acetate, 0.96 g of dibutyltin dilaurate and 1.92 g of 2,6-di-tert.-butylcresol were weighed into a stirred vessel fitted with a thermocouple, dropping funnel, reflux condenser, gas inlet and gas outlet. Three times the vessel volume of air per hour were passed through the batch with stirring, and six times the vessel volume of nitrogen per hour were passed over the batch. The batch was heated to 50° C. Above 50° C., 806 g of hydroxyethyl acrylate was added dropwise such that the temperature rose to a maximum of 60° C. due to the exothermic reaction. After the addition of the hydroxyethyl acrylate was complete (duration about 6 to 8 hours), the batch was stirred at 60° C. for an additional hour. A urethane acrylate solution was formed which contained no free NCO groups.

In the following examples the NCO/OH equivalent ratio was 1:1.

Example 3

Component I:

| | | |
|---|---|---|
| 151.9 | parts | urethane acrylate corresponding to Example 1 |
| 83.9 | parts | a 4:1 blend of solvent naphtha 100 solvent and 2-butoxyethanol (4/1) |
| 11.1 | parts | UV stabilizer (Tinuvin 1130, Ciba), 50% in butyl diglycol acetate |
| 5.5 | parts | HALS stabilizer (Tinuvin 292, Ciba), 50% in butyl diglycol acetate |
| 1.8 | parts | (BYK 345, Byk) flowing agent |
| 1.8 | parts | (BYK 333, Byk), flowing agent, 25% in water |
| 3.5 | parts | photoinitiator (Irgacure 184, Ciba), 50% in hexanediol diacrylate |

Component II:

| 132.6 parts | of a 46% aqueous polyacrylate dispersion in a 44.6:6.5:1.6 blend of water, solvent naphtha 100 solvent and 2-butoxyethanol, neutralized with 1.5 parts of dimethyl ethanolamine, and having an OH content of about 4.5%, based on solids (Bayhydrol VP LS 2271, Bayer AG). |
| --- | --- |
| 145.9 parts | of a 42% aqueous, urethane-modified polyester dispersion in a 54:3 blend of water and N-methylpyrrolidone, neutralized with 1 part of dimethylethanolamine, and having an OH content of about 3.8%, based on solids (Bayhydrol VP LS 2231, Bayer AG) and |
| 65.4 parts | water. |

The two components were homogeneously mixed by nozzle jet dispersion as described in DE-A 19510651 using a nozzle of diameter 0.1 mm at 50 bar, and were applied using a commercially available spray gun to a metal panel which had been previously coated with a pigmented, 2-component polyurethane coating to give a dry film thickness of about 120 g/cm².

The wet coat was dried by aeration for 5 minutes at room temperature, followed by pre-drying for 10 minutes at 80° C. and subsequent UV-hardening (1 m/minute belt speed, 1 high-pressure 80 W/cm Hg radiation emitter at a distance of 10 cm). Further drying was carried out at room temperature.

The resulting hardness was tested by Konig pendulum damping, and the resistance to solvents was measured after 1 hour, after 1 day and after 7 days. The results are set forth in Table 1.

Example 4

Component I:

This corresponded to component I of Example 3, except that 63.7 parts methoxypropyl acetate were used instead of 83.9 parts solvent naphtha 100/2-butoxyethanol (4/1).

Component II:

| 129.7 parts | binder vehicle A |
| --- | --- |
| 144.5 parts | binder vehicle B |
| 91.6 parts | water |

Mixing, application, drying and testing of the coating were carried out as described in Example 3.

Example 5

Component I:

| 72.7 parts | urethane acrylate from Example 1 |
| --- | --- |
| 96.0 parts | urethane acrylate from Example 2 |
| 81.1 parts | methoxypropyl acetate |
| 6.7 parts | UV absorber (Sanduvor 3206, Clariant), 80% in xylene |
| 2.7 parts | (BYK 306, Byk) flowing agent |
| 10.9 parts | photoinitiator (Irgacure 185, Ciba), 50% in hexanediol diacrylate |

Component II:

| 98.0 parts | binder vehicle A |
| --- | --- |
| 96.5 parts | water |

Mixing, application, drying and testing of the coating were carried out as described in Example 3.

Example 6 (comparison)

Component I:

| 110.3 parts | Desmodur VP LS 2025/1 (Bayer) polyisocyanate trimer based on hexamethylendiisocyanate, NCO content 23% |
| --- | --- |
| 42.9 parts | solvent naphtha 100/2-butoxyethanol (4/1) |
| 11.1 parts | UV stabilizer (Tinuvin 1130, Ciba), 50% in butyl diglycol acetate |
| 5.5 parts | HALS stabilizer (Tinuvin 292, Ciba), 50% in butyl diglycol acetate |
| 1.8 parts | (BYK 345, Byk) flowing agent |
| 1.8 parts | (BYK 333, Byk) flowing agent, 25% in water |

Component II:

| 176.6 parts | polyacrylate dispersion from Example 3 |
| --- | --- |
| 194.3 parts | urethane-modified polyester dispersion from Example 3 |
| 55.7 parts | water |

Mixing, application, drying and testing of the coating were carried out as described in Example 3.

Results

| Example | 3 | 4 | 5 | 6 |
| --- | --- | --- | --- | --- |
| Pendulum damping[1] | | | | |
| After 1 hour | 31 | 30 | 104 | 6 |
| After 24 hours | 74 | 77 | 134 | 14 |
| After 168 hours | 129 | 128 | 146 | 85 |
| Resistance to solvents[2] | | | | |
| after 24 hours | 2/2/3/4 | 1/1/3/4 | 0/0/2/4 | 4/4/5/5 |
| After 168 hours | 0/0/2/3 | 0/0/2/3 | 0/0/0/3 | 1/1/3/5 |

[1] in seconds (König method)
[2] xylene/methoxypropyl acetate/ethyl acetate/acetone; time of action 5 minutes
0 = unchanged
5 = detached/destroyed Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous coating composition comprising
   a) urethane (meth)acrylate having (meth)acryloyl groups that is the reaction product of a polyisocyanate and a monohydric alcohol having (meth)acrvloyl groups at an equivalent ratio of NCO groups to OH groups of 1:0.2 to 1:0.8,
   b) optionally a further polyisocyanate
   c) a UV initiator which initiates polymerization by a free radical mechanism, and
   d) one or more aqueous binders containing isocyanate-reactive groups.

2. The coating composition of claim 1 wherein the aqueous binder is a polyol.

3. The coating composition of claim 1 wherein the equivalent ratio of the (meth)acryloyl groups of component a) to the sum of the free isocyanate groups of components a) and b) is 0.5:2.0 to 2.0:0.5.

4. The coating composition of claim 1 which additionally contains a UV absorber having an absorption range of up to 390 nm.

5. The coating composition of claim 1 which additionally contains a HALS stabilizer.

6. A substrate coated with the coating composition of claim 1.

7. A metal substrate coated with the coating composition of claim 1.

* * * * *